United States Patent [19]

Friesen et al.

[11] Patent Number: 5,753,008
[45] Date of Patent: May 19, 1998

[54] SOLVENT RESISTANT HOLLOW FIBER VAPOR PERMEATION MEMBRANES AND MODULES

[75] Inventors: Dwayne T. Friesen; Scott B. McCray; David D. Newbold; Roderick J. Ray, all of Bend, Oreg.

[73] Assignee: Bend Research, Inc., Bend, Oreg.

[21] Appl. No.: 501,403

[22] Filed: Jul. 12, 1995

[51] Int. Cl.$^6$ .............. B01D 53/22; B01D 69/08; B01D 61/36

[52] U.S. Cl. .............. 95/45; 96/10; 96/12; 210/321.89; 210/500.23; 210/500.39; 210/640; 264/48; 264/171.26

[58] Field of Search ................. 210/640, 638, 210/500.39, 651, 321.8, 321.89, 500.23, 500.33, 508, 650; 95/45, 52; 96/10, 12, 13; 427/245; 264/41, 48, 171.26, 171.28

[56] References Cited

U.S. PATENT DOCUMENTS

| | | | |
|---|---|---|---|
| 4,440,643 | 4/1984 | Makino et al. | 210/500.2 |
| 4,871,461 | 10/1989 | Karakane et al. | |
| 4,875,908 | 10/1989 | Kikukawa et al. | |
| 4,889,636 | 12/1989 | Perry et al. | 210/651 |
| 4,913,818 | 4/1990 | Van Wijk et al. | |
| 4,929,405 | 5/1990 | Kohn. | |
| 4,963,165 | 10/1990 | Blume et al. | |
| 4,978,430 | 12/1990 | Nakagawa et al. | |
| 5,002,590 | 3/1991 | Friesen et al. | 95/52 |
| 5,039,421 | 8/1991 | Linder et al. | 210/651 |
| 5,108,464 | 4/1992 | Friesen et al. | 95/52 |
| 5,156,656 | 10/1992 | Parker et al. | 96/10 |
| 5,160,514 | 11/1992 | Newbold et al. | 95/52 |
| 5,236,474 | 8/1993 | Schofield et al. | 96/10 |
| 5,248,427 | 9/1993 | Spiske et al. | |
| 5,310,415 | 5/1994 | Simmons et al. | 95/45 |
| 5,464,540 | 11/1995 | Friesen et al. | 210/640 |
| 5,611,842 | 3/1997 | Friesen et al. | 95/45 |

OTHER PUBLICATIONS

Rautenbach et al., "Vapor Permeation of Water–Organic Mixtures, Module & Process Design," *Proc. 3d Int'l. Conf. Pervaporation* (1988).

Suemsatsu et al., "Separation of Ethanol–Water Mixtures by Vapor Permeation Through Cellophane Membrane," 14 *Membrane* 337 (1989).

*Primary Examiner*—Joseph W. Drodge
*Attorney, Agent, or Firm*—Chernoff, Vilhauer, McClung & Stenzel, LLP

[57] ABSTRACT

A vapor permeation method and apparatus for removing a vapor from a vaporous feed stream, the method and apparatus utilizing highly solvent-resistant composite hollow fiber membranes and a permeate flow countercurrent to the feed flow, wherein the support of the composite membrane is formed by solution casting and has been rendered sufficiently solvent-resistant by a post-casting step to retain at least 20 of its burst pressure when soaked in the solvent used to cast the support.

59 Claims, No Drawings

SOLVENT RESISTANT HOLLOW FIBER VAPOR PERMEATION MEMBRANES AND MODULES

BACKGROUND OF THE INVENTION

Vapor permeation is a membrane-based process that can be used to separate mixtures of vapors. In an example of such a process, a vaporous mixture of ethanol containing low concentrations of water is fed to the feed side of a membrane, while a vacuum pump or gaseous sweep stream, usually in combination with a condenser, maintains a sufficiently low partial pressure of water on the permeate side of the membrane to provide a chemical potential gradient of water across the membrane. Water and some ethanol are transported to the permeate side of the membrane to form a vapor-phase permeate.

There are three known basic ways to maintain sufficiently low partial pressure of water on the permeate side of a membrane module, namely, by vacuum, by dilution and by countercurrent sweep. Each is explained below.

The vacuum method A vacuum pump and condenser are used to reduce the total pressure on the permeate side of the membrane. Since very low pressures are required to maintain the permeate side partial pressure below that of the feed, systems that rely on this method tend to be relatively costly and complex.

The dilution method Here, the membrane is designed such that some of the alcohol in the feed stream permeates the membrane, diluting the water in the permeate, reducing its partial pressure, and maintaining a driving force. This technique is usually employed with a vacuum pump and condenser on the permeate side of the membrane, as in the vacuum method. However, the permeate pressure required is not as low as in the vacuum method due to the dilution effect. There are two primary draw-backs with this method: (1) it lacks versatility in that the rate at which alcohol passes through the membrane is fixed by the membrane characteristics and the operating conditions, and therefore cannot be easily adjusted; and (2) since the permeating feed stream permeates equally along the length of the membrane, the feed that permeates near the feed end of the module is "wasted" since the partial pressure of water in the feed is already high and the permeated feed passes along only a portion of the membrane length. As a result, more alcohol must be "leaked" through the membrane than is ideally needed, resulting in a loss in selectivity. However, the dilution method can be effective, especially when the permeate is allowed to flow countercurrent to the feed stream. In such a case, the permeate passes through the membrane and mixes with the permeate gas from the retentate end of the module in such a way as to lower the partial pressure of water in contact with the permeate side of the membrane, and exits the module in the direction opposite that of the feed flow.

The countercurrent sweep method A countercurrent sweep stream is used (in conjunction with a vacuum pump and condenser) to maintain a partial pressure driving force across the membrane. Because all of the sweep stream enters the permeate at the retentate end of the module, the partial pressure of water is very low and therefore the driving force for transport at the retentate end of the module is maximized. Additionally, because the sweep stream flows countercurrent to the feed stream, the overall driving force for the module is maximized. In addition, the process is quite versatile in that the amount of sweep used may readily be controlled by a valve, making it easy to alter the driving force, allowing for changes in feed composition, temperature, and pressure—all without affecting the overall performance of the system. Thus, the resulting process may be made highly selective, since the optimal amount of sweep to maintain high driving force can be used.

A significant problem that has hindered the commercialization of the vapor permeation process is the high cost for the plate-and-frame modules often used for vapor permeation. While lower-cost spiral-wound modules have been considered for this process, they have not proven to be effective.

It is therefore an object of the present invention to provide a low-cost and easy-to-operate vapor permeation module.

It is a further object of the present invention to provide a highly efficient method and apparatus for vapor permeation.

It is a still further object of the present invention to provide a novel, highly selective composite hollow fiber membrane.

These and other objects, which will become apparent to one of ordinary skill, are accomplished by the present invention, which is summarized and described in detail below.

SUMMARY OF THE INVENTION

The present invention comprises a novel vapor permeation method and apparatus. The apparatus comprises a bundle of thin-film composite hollow fibers arranged substantially parallel to each other in a chamber or module with a means for removing permeate vapor located near the feed end of the module so as to cause the flow of permeate to be countercurrent to that of the flow of the feed. The composite fibers in the module comprise support fibers of very high permeability and solvent-resistance and a thin, permselective coating on the surface of the support fibers. The support fibers are formed from a polymer dissolved in a solvent and then rendered solvent-resistant in a post-treatment step. In two closely related aspects of the invention, a class of highly selective coatings for the composite fibers has been discovered, as well as an improved method of using the hollow fiber vapor permeation membranes that utilize a countercurrent condensable sweep gas.

DETAILED DESCRIPTION OF THE INVENTION

In the following description, we use the removal of water from an alcohol as an example of the type of separation one can perform with the process and apparatus of the present invention. As described below, many other types of separations are possible with this technology.

Permeation of water from a wet alcohol feed stream through a membrane to the permeate side of the membrane is driven by maintaining a higher water partial pressure on the feed side of the membrane relative to the water partial pressure on the permeate side. It is important to maintain a water partial pressure differential across the membrane that is as high as possible, as the rate of water transport is proportional to the partial pressure differential. Maintaining a high water partial pressure differential is also important from the standpoint of minimizing membrane surface area, since the membrane area required is inversely proportional to the water partial pressure differential.

The partial pressure of water on the feed side of the membrane can be increased by heating the feed stream—generally vaporizing the feed at either ambient pressure or higher. As water permeates the membrane, its partial pressure on the permeate side of the membrane will rise unless it is removed from the permeate side of the module.

The preferred methods of maintaining proper partial pressures on either side of the membrane in vapor permeation applications are the dilution method using a countercurrent permeate flow and the countercurrent sweep method.

According to the apparatus aspect of the present invention, there is provided a vapor permeation module for separating a first vapor from a feed stream comprising a mixture of vapors, the module comprising:

(a) a chamber having feed and retentate ends and means for removing permeate vapor near the feed end;

(b) a bundle of thin film composite hollow fiber membranes arranged substantially parallel to each other in the chamber, each of the composite hollow fiber membranes comprising (i) a highly permeable solvent-resistant hollow support fiber, the support fiber having been formed from a polymer dissolved in a solvent and then rendered solvent-resistant in a post-treatment step, whereby the solvent-resistant hollow support fiber retains at least 20% of its burst pressure when soaked in the solvent used to dissolve the polymer, and (ii) a permselective coating on the surface of the support fiber, the permselective coating being cross-linked and having a selectivity of at least 5 for the first vapor relative to at least one other vapor in the mixture of vapors; and (c) sealing means for securing and sealing the bundle of hollow fiber membranes to the chamber shell at its feed and retentate ends so as to permit fluid communication with the feed gas.

The present invention also provides a vapor permeation process comprising:

(a) contacting a feed stream comprising a first vapor and at least one additional vapor with the feed side of thin film composite hollow fiber membranes arranged substantially parallel to each other in a chamber having feed and retentate ends, each of the composite hollow fiber membranes comprising (i) a highly permeable solvent-resistant hollow support fiber, the support fiber having been formed from a polymer dissolved in a solvent and then rendered solvent-resistant in a post-treatment step, whereby the solvent-resistant hollow support fiber retains at least 20% of its burst pressure when soaked in the solvent used to form the polymer solution, and (ii) a permselective coating on the surface of the support fiber, said permselective coating being cross-linked and having a selectivity of at least 5 for the first vapor over at least one other vapor in the mixture of vapors;

(b) permitting the first vapor in the feed stream to permeate from the feed to the permeate side of the hollow fiber membranes to form a permeate stream enriched in the first vapor and a retentate stream depleted in the first vapor; and (c) removing the permeated first vapor from the chamber by permeate removal means located near the feed end of the chamber.

The vaporous mixture comprising the feed stream to the membrane selected for the vapor permeation process of the present invention may be derived from a variety of sources, including industrial process vent streams; the vaporous overhead from a distillation or evaporation process; the overhead from a reflux process; vaporized liquids from industrial process liquids; the production of fine chemicals; the production of pharmaceuticals; the recovery or purification of flavors and fragrances from natural products; or from fermentation processes.

The separation to be achieved by the vapor permeation process of the present invention may be the removal of water from organics and inorganics; the removal of volatile compounds from water vapor; or the separation of organic and inorganic vapor mixtures. Generally, the membrane used is selected so that the minor component of the feed stream is selectively removed; however, the invention need not be so limited.

For the removal of water from organics and inorganics, the non-water vapor component may be virtually any compound. Examples include chlorofluorocarbons such as Freons and Halons; chlorinated hydrocarbons, such as methylene chloride, trichloroethylene, trichloroethanes, carbon tetrachloride, and chlorobenzene; nonchlorinated hydrophobic organics, such as benzene, toluene, xylene, ethyl benzene, cyclohexane, hexane, octane, and petroleum distillates; nonchlorinated hydrophilic organics, such as methanol, ethanol, isopropyl alcohol, other alcohols, acetone, ethyl acetate, methyl ethyl ketone, methyl t-butyl ketone, other ketones, nitrobenzene, phenols, cresols, formic acid, acetic acid, and other organic acids; nitrogen compounds, including amines, triethylamine, pyridine, acetonitrile, dimethyl formamide, dimethylacetamide, and N-methyl pyrrolidinone; and volatile inorganic compounds such as bromine, iodine, hydrazine, and hydrogen cyanide.

For the removal of volatile compounds from water, the volatile compound to be removed may be virtually any compound with sufficient volatility to be present in the vapor phase. Generally, this includes compounds with boiling points that are less than about 200° C. at atmospheric pressure. Examples generally include the same classes of compounds comprising the non-water vapor components mentioned in the preceding paragraph. As to volatile inorganic compounds, exemplary compounds include ammonia, bromine, iodine, sulfur dioxide, and thionyl chloride.

For separation of organic mixtures, the mixtures may comprise various organic species. Organic mixtures that can be separated include methanol from other organic solvents; mixtures of isomers and components from natural extracts; olefins from paraffins, such as the removal of propylene from propane; and aromatics from non-aromatics, such as the removal of benzene from gasoline or other hydrocarbons.

As mentioned above, the support fiber must be highly permeable as well as solvent-resistant. It has been found that this combination of high permeability and high solvent resistance can be obtained by using a support fiber that is formed from a polymer dissolved in a solvent and then rendered solvent-resistant in a post-treatment step. Examples of polymers that can be used for this purpose include poly(amic acids), polyimides, polybenzimidazoles, polyphenylquinoxolanes, and polymers with post-cross-linkable pendant or terminal groups, such as polysulfones, polyethersulfones and polyetherimides containing pendant or terminal ethynyl groups.

To form the support fiber the polymer can be dissolved in any solvent that dissolves the polymer to a concentration of at least 5 wt %. Examples include dimethyl formamide (DMF), dimethylacetamide (DMAc), N-methyl pyrrolidinone (NMP), methylene chloride (MeCl), tetrahydrofuran (THF), toluene, acetone, and dimethyl sulfoxide (DMSO).

The post-treatment step used to render the support fiber solvent-resistant is selected such that the polymer is no longer soluble in the solvent used to form the polymer solution. Many processes can be selected for the post-treatment step, including heat treating at high temperature, exposure to UV light, microwaves, X-ray radiation, or electron beams. The post-treatment step can render the polymer insoluble in a number of different ways, including conversion of the precursor polymer from a linear to a cyclic form (e.g., conversion of a poly(amic acid) to a polyimide); cross-linking of the polymer via ring-opening; free-radical vinyl or ethynyl reactions; and condensation reactions (e.g., ester, amide, or urethane linkage formation).

The solvent-resistance of the support fiber must be sufficiently high that it performs well in the presence of solvents. Generally, the support fiber must retain at least 10% of its burst pressure when soaked in the solvent used to form the polymer solution used to form the support fiber, and more preferably at least 50% of its burst pressure.

In addition, the permeability of the support fiber must be sufficiently high so that it does not provide a major resistance to the flow of permeate through the composite membrane. This high permeability must be retained even after the post-treatment step. Generally, the permeability of the fibers to dry nitrogen should be greater than 5 normal cubic meters per square meter per hour per atmosphere driving force ($Nm^3/m^2 \cdot hr \cdot atm$), and more preferably greater than 50 $Nm^3/m^2 \cdot hr \cdot atm$.

More specifically, it has been found that a preferred hollow support fiber can be fabricated from a solution of a polyamic acid spun into a nonsolvent by conventional solution-spinning techniques. The micro-porous fiber is then converted to the corresponding polyimide, with retention of porosity, by heat treating at >250° C. To achieve the highest degree of solvent resistance while retaining a high permeability the microporous fiber is formed from a copolyimide wherein the copolyimide comprises the imidization reaction product of the condensation reaction product in a solvent of at least three reactants selected from (1) a diamine A or A' and (2) a dianhydride B or B', wherein A, A', B, and B' are selected so that the homopolymer formed from the condensation reaction of A with B, following post treatment, has a glass-transition temperature $\geq 300°$ C.; and the homopolymer formed from the condensation reaction of A' with B', following post treatment, has a resistance to the solvent used to form an asymmetric microporous membrane that is characterized by absorption of $\leq 50$ wt % after soaking the nonporous polymer in the solvent in pure form at 20° C. for at least 24 hours.

The key advantages of such microporous hollow fiber membranes formed by the process of the present invention are that one component (A+B) provides a sufficiently high glass transition temperature to permit retention of the microporous structure of the precursor polyamic acid fiber when converted by heat treatment to the polyimide form; and another component (A'+B'), following post-treatment such as by heat, provides exceptional solvent-resistance. In addition, when the component (A+B) is converted to the polyimide form, in some cases, cross-linking is induced, which is another favorable characteristic for stability and solvent-resistance.

The material used as the permselective coating may be virtually any material, provided it has a selectivity of at least 5 for at least one vapor in the feed relative to another vapor in the feed. Here, selectivity is defined as the ratio of the permeability to the first vapor to the permeability of the second vapor, where permeability is defined as the amount of vapor that passes through the membrane per unit area, unit time, unit thickness, and unit driving force. It has been found that if the selectivity is less than 5, the resulting separation is not efficient, requiring several stages of membranes to effect the separation.

For the removal of water vapor from other vapors, it is best that the permselective coating material be more permeable to water vapor than to other components in the feed stream. In this case, the material is preferably very hydrophilic. Examples of perm-selective coating materials useful for removing water from organics include polyvinyl alcohol, cellulosic materials, chitin and derivatives thereof, polyurethanes, polyamides, polyamines, poly(acrylic acids), poly(acrylates), poly(vinyl acetates), and polyethers. Other polymers normally viewed as not especially hydrophilic (e.g., polyolefins, polystyrene, and poly-acrylates) can be rendered sufficiently hydrophilic to be useful as membrane materials by incorporating hydrophilic groups such as hydroxyl, amine, carboxyl, ether, sulfonate, phosphonate, quaternary amine, and ester functionalities. Such groups can be incorporated by choosing monomers that contain such groups or by adding them in a post-treatment step such as radiation- or plasma-grafting. Blends and copolymer versions of these materials are also useful. The coating material should also be cross-linked to provide sufficient resistance to swelling or dissolution by components of the feed stream.

A particularly preferred permselective coating material for dehydration of organics is a blend of poly-vinyl alcohol (PVA) and polyethyleneimine (PEI), wherein the material is cross-linked through the amine groups of the PEI using ethyl succinate by heating to elevated temperatures. By varying the ratio of PVA to PEI or the amount of ethyl succinate cross-linking agent used, the selectivity and permeability of the membrane may be adjusted. This coating will be extremely effective for vapor-permeation applications. However, it will also prove useful for other separations including dehydration of organics by pervaporation; the removal of water vapor from compressed gas streams, such as air and natural gas; and for use in fuel cells, allowing the transport of water while restricting the passage of hydrogen.

For the removal of volatile compounds from water vapor, the permselective coating is usually, but not always, an elastomeric or rubbery polymer. Examples of materials useful for such separations include natural rubber; nitrile rubber; polystyrene-butadiene copolymers; poly(butadiene-acrylonitrile) rubber; polyurethanes; polyamides; polyacetylenes; poly(trimethylsilylpropyne); fluoroelastomers; poly(vinylchlorides); poly(phosphazenes), particularly those with organic substituents; halogenated polymers, such as poly(vinylidene fluoride) and poly(tetrafluoroethylene); and polysiloxanes, including silicone rubber. Blends and copolymer versions of these materials are also useful. Ion-exchange membranes and composites may also be used for some applications. A particularly preferred coating for the removal of volatile compounds from water vapor is poly(dimethylsiloxane) and derivatives thereof.

For separation of organic mixtures, the choice of membrane material will depend on the organic vapors being separated. Many of the polymers listed above for the dehydration of organics or the removal of volatile organics from water vapor will work well for separating certain organic mixtures. In particular, it is common to use copolymers for separating organics since the ratio of the so-called "hard" and "soft" segments can easily be adjusted to provide the desired selectivity.

The coating material may be placed on the surface of the support fiber using a number of different techniques, including dip-coating, painting, spray-coating, solution-coating, or by interfacial polymerization. The coating may be placed on the inside or outside surface of the support fiber; in most applications it is preferred that the coating be placed on the inside.

As noted above, the apparatus of the present invention is particularly useful when used in conjunction with a countercurrent sweep stream. In this case, means is provided for connecting a sweep stream to the permeate side of the module near the retentate end of the module. The sweep stream may be a gas such as air, argon, nitrogen, or methane; a vapor such as water vapor (steam), ethanol or other alcohols, propane or other hydrocarbons, acetone or other ketones; or virtually any other compound commonly encountered as a feed stream component. The sweep stream may also be a mixture. It is often desirable for the sweep stream to comprise a portion of either the retentate stream or feed stream. The means for introducing the sweep stream include one or more ports in the module housing, a conduit through the means for securing and sealing the hollow fiber bundle in the module housing, or any other arrangement that results in the sweep stream flowing on the permeate side of the fibers substantially countercurrent to the flow of the feed stream. The sweep stream and any permeated species are then removed from the permeate side of the housing through one or more permeate ports, located near the feed end of the module.

EXAMPLE 1

Preparation of Hollow Support Fibers

To a 2-liter resin kettle equipped with an overhead stirrer and a nitrogen sparge was added 1033 g of NMP and 108.1 g of oxydianaline (ODA). Next, 2.0 g of phthalic anhydride (an end-capping agent) was added. Then, 104.8 g of benzophenone tetracarboxylic acid dianhydride (BTDA) and 47.0 g of pyromellitic dianhydride (PMDA) were added in three portions over a 3-hour period. The mixture was then stirred overnight. This resulted in the formation of a BTDA/PMDA/ODA copolyamic acid solution containing 20 wt % solids. The molar ratio of BTDA/ODA to PMDA/ODA was 1.5. The Brookfield viscosity of the copolyamic acid solution at 30° C. was 35,000 cp.

Glycerol was slowly added to this solution as a nonsolvent until the concentration of glycerol in the final solution was 25 wt %, thus forming a fiber-spinning solution. This solution was then extruded through a tube-in-orifice spinneret using a solution of 40 wt % methanol in water as the internal coagulation solution. The fiber was drawn into a coagulation bath of 100% water, where it precipitated, forming a hollow fiber. The hollow fiber was then rinsed in isopropyl alcohol and air-dried for several hours.

The polyamic acid hollow fiber was then imidized and cross-linked by placing the fiber in a nitrogen atmosphere and annealing using the following regimen: 1 hour at 100° C.; 1 hour at 200° C.; and 1 hour at 300° C. The resulting polyimide hollow fiber had an internal diameter of 218 μm and a wall thickness of about 85 μm. The fiber burst at a pressure of 33 atm. The permeance of the fiber to dry nitrogen was 130 $Nm^3/m^2 \cdot hr \cdot atm$, and the fiber had a selectivity for oxygen over nitrogen of 0.9.

Samples of the fiber were soaked for 72 hours in pure solvents. The results of these tests, shown in Table I, indicate that the fiber has exceptional solvent resistance.

TABLE I

| Solvent | Burst Pressure After Exposure for 72 Hours at Room Temperature (atm) | Retention of Burst Pressure (%) |
|---|---|---|
| None (before exposure) | 33 | 100 |
| Gasoline | 32 | 98 |
| Toluene | 23 | 71 |
| Benzene | 23 | 71 |
| Methanol (MeOH) | 31 | 93 |
| Ethanol (EtOH) | 29 | 88 |
| Acetone | 27 | 81 |
| MeCl | 20 | 60 |
| DMAc | 22 | 67 |
| NMP | 21 | 62 |

EXAMPLE 2

A selective coating was formed on the inner surface or lumens of the support fibers of Example 1 using the following procedure.

Preparation of Solution A: 10 g of PEI (Polymin P from BASF) was dissolved in 90 g water to make a 10 wt % solution.

Preparation of Solution B: 10 g of PVA (Elvanol 71-30 from DuPont) was dissolved in 90 g of hot (80° C.) water and then allowed to cool, forming a 10 wt % solution.

Preparation of Solution C: 10 g of succinic anhydride and 5 g of 1M HCl were dissolved in 85 g of hot (65° C.) EtOH, and then allowed to cool.

Preparation of the Coating Solution: 47 g of Solution A, 23 g of Solution B, and 10 g of Solution C were dissolved in 10 g water and 10 g EtOH. Two drops of surfactant (Iconol OP-10 from BASF) were then added to this solution.

Application of the Coating: The lumens of the hollow fibers of Example 1 were filled with the coating solution for 1 minute, and then drained by the force of gravity. Dry nitrogen at room temperature was first forced through the lumens of the fibers for 10 minutes; then repeated for another 10 minutes. Hot nitrogen at 80° C. was then forced through the lumens of the fibers for 2 hours. The temperature of the nitrogen was then increased to 130° C. and the procedure repeated for 3 hours. Finally, dry nitrogen at ambient temperature was forced through the lumens of the fibers overnight. The resulting composite hollow fibers had a permeability to dry nitrogen of between 0.001 and 0.002 $Nm^3/m^2 \cdot hr \cdot atm$ at a pressure of 7.8 atm.

EXAMPLE 3

A bundle of 20 hollow support fibers made by the method of Example 1 except with an internal diameter of 280 μm, were incorporated into a module using an epoxy potting compound. The module was equipped with a permeate port located near its feed end. The effective length and area of the fibers were 38 cm and 67 $cm^2$, respectively. A permselective coating was formed on the inside surfaces of the fibers in this module using the procedure described in Example 2, thus forming a composite hollow fiber vapor permeation module.

This module was then tested using a vaporous feed stream of 20.3 wt % water in isopropyl alcohol (IPA) at 91° C. A vacuum pump/condenser was used to reduce the total pressure on the permeate side of the hollow fiber membranes to 0.01 atm. The results of this test are shown in Table II.

EXAMPLE 4

A composite hollow fiber module essentially the same as that described in Example 3 except that the module contained 30 fibers with inside diameters of 330 μm and having 118 cm$^2$ of surface area was operated in a vapor permeation test on a feed solution of 10.2 wt % water in MeOH at 72° C. The permeate pressure was maintained at 0.02 atm. The results of this test are given in Table II.

EXAMPLE 5

A composite hollow fiber module essentially the same as that described in Example 3 except that the module contained 50 fibers with inside diameters of 320 μm and having 191 cm$^2$ of surface area was operated in a vapor permeation test on a feed solution of 4.9 wt % water in EtOH at 93° C. The permeate pressure was maintained at 0.01 atm. The results of this test are given in Table II.

TABLE II

| Example | Alcohol | Feed Water Conc. (wt %) | Retentate Water Conc. (wt %) | Permeate Water Conc. (wt %) | Water Flux (kg/ m$^2$ · d) | Water Perm. (kg/m$^2$ · d · atm) | Selectivity (water/ alcohol) |
|---|---|---|---|---|---|---|---|
| 3 | IPA | 20.3 | 0.6 | 99.0 | 8.9 | 63 | 490 |
| 4 | MeOH | 10.2 | 0.5 | 49.0 | 6.0 | 83 | 18 |
| 5 | EtOH | 4.9 | 2.8 | 94.2 | 11.2 | 133 | 183 |

EXAMPLE 6

A composite hollow fiber module of essentially the same as that described in Example 3 was made except that the module contained 38 fibers with inside diameters of 365 μm and having 166 cm$^2$ of surface area and inside surfaces were coated with a cross-linked PVA. This module was operated in a vapor permeation test on a feed mixture of 16 wt % water in MeOH at 77° C. and a feed pressure of 1.1 atm. The permeate pressure was maintained at 0.1 atm. In addition, a condensable sweep stream comprising 100% MeOH at 75° C. and 0.1 atm was introduced to the permeate side of the membrane at a sweep inlet port located near the retentate end of the module so as to flow countercurrent to the flow of the feed.

Under the operating conditions described above, the combined permeate side mixture had a water concentration of 66 wt %, resulting in an enrichment factor (ratio of water concentration in the permeate to water concentration in the feed) of 4.1. The water flux through the membrane was 6 kg/m$^2$·day.

For comparison, the module was operated under the same conditions without the countercurrent condensable sweep stream. In this experiment, the feed solution comprised 11 wt % water in MeOH and the permeate pressure was set at 0.01 atm. In this case the water flux through the membrane was only 3 kg/m$^2$·day—only half of the water flux obtained using a countercurrent condensable sweep, while the enrichment factor was 4.5, even though the system was operated with a permeate pressure that was 10 times lower than that used with the countercurrent condensable sweep.

EXAMPLE 7

A composite hollow fiber module of essentially the same design as that described in Example 3 was made except that the module contained 38 fibers with inside diameters of 360 μm and having 166 cm$^2$ of surface area. A permselective coating of cross-linked polydimethyl-siloxane (PDMS) was placed on the inside surfaces of the fibers using the following procedure. The lumens of the hollow fibers were filled with a solution of 10 wt % PDMS (Sylgard 184 from Dow) in toluene for 1 minute. The lumens were then drained and dry nitrogen was forced through the lumens for 10 minutes; then repeated for another 10 minutes. Hot air at 100° C. was then forced through the lumens for 2 hours. Ambient temperature air was then blown through the fiber lumens overnight. The resulting composite hollow fiber module had a permeability to dry nitrogen of 0.05 Nm$^3$/m$^2$·hr·atm and a selectivity for oxygen over nitrogen of 2.1 when tested on pure gases at 8 atm.

EXAMPLE 8

The module of Example 7 was operated in a vapor permeation test using a feed stream consisting of 670 ppm benzene in hexane at 90° C. fed at a rate of 3.0 g/min to the lumens of the hollow fibers at a pressure of 1.0 atm. A condensable sweep stream comprising 100% hexane at 90° C. and 0.1 atm was introduced to the permeate side of the membrane at a sweep inlet port located near the retentate end of the module so as to flow countercurrent to the flow of the feed. The flow rate of the hexane vapor sweep was set at 0.2 g/min.

A combined permeate side mixture comprising the condensable vapor sweep stream and the benzene that selectively permeated the membrane was withdrawn from the permeate outlet port located near the feed end of the module. Under these operating conditions, the benzene flux through the membrane module was 0.17 kg/m$^2$·day.

As a comparison, the same module operated without a countercurrent condensable sweep stream at a permeate pressure of 0.2 atm had a benzene flux of 0.13 kg/m$^2$·day. The module using the countercurrent condensable sweep stream therefore had a higher benzene flux than the module operated without a condensable sweep stream.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A vapor permeation module for removing a first vapor from a feed stream comprising a mixture of vapors not containing any liquid, the module comprising:

(a) a chamber having feed and retentate ends and means for removing permeate vapor near the feed end;

(b) a bundle of thin film composite hollow fiber membranes arranged substantially parallel to each other in said chamber, each of said composite hollow-fiber membranes comprising:

(i) a highly permeable solvent-resistant hollow support fiber comprising a polymer selected from the group consisting of polyimides, polybenzimidazoles, polyphenylquinoxolanes, and polymers with pendant or terminal cross-linkable groups, said support fiber having been formed from a polymer dissolved in a solvent and then rendered solvent-resistant in a post-treatment step, wherein said solvent-resistant hollow support fiber retains at least 20% of its burst pressure when soaked in said solvent used to form said polymer solution, and (ii) a permselective coating on the surface of said support fiber, said permselective coating being a cross-linked polymer selected from the group consisting of poly (acrylic acids), poly (acrylates), polyacetylenes, poly (vinyl acetates), polyacrylonitriles, polyamines, polyamides, polyethers, polyurethanes, polyvinyl alcohols, polyesters, cellulose, cellulose esters, cellulose ethers, chitosan, chitin, polymers containing hydrophilic groups, elastomeric polymers, halogenated polymers, fluoroelastomers, polyvinyl halides, polyphosphazenes, poly (trimethylsilylpropyne), polysiloxanes, poly (dimethyl siloxanes) and copolymers and blends thereof, and having a selectivity of at least 5 for said first vapor over at least one other vapor in said mixture of vapors; and (c) means for securing and sealing said bundle of hollow fiber membranes to said chamber at said feed and retentate ends so as to permit fluid communication with said feed gas.

2. The module of claim 1 wherein said feed stream is directed to the inside of said composite hollow fiber membranes.

3. The module of claim 1 wherein said feed stream is directed to the outside of said composite hollow fiber membranes.

4. The module of claim 1 wherein said permselective coating is on the inside of said hollow support fiber.

5. The module of claim 1 wherein said permselective coating is on the outside of said hollow support fiber.

6. The module of claim 1 wherein said hollow fiber comprises a polymer having pendant or terminal ethynyl groups, the polymer being selected from the group consisting of polysulfones, polyethersulfones and polyetherimides.

7. The module of claim 1 wherein said hollow support fiber has a maximum surface pore size of less than about 0.5 μm.

8. The module of claim 1 wherein said hollow support fiber has an effective nitrogen permeability of greater than 5 $Nm^3/m^2$-hr-atm.

9. The module of claim 8 wherein said hollow support fiber has an effective nitrogen permeability greater than 50 $Nm^3/m^2$-hr-atm.

10. The module of claim 1 wherein said solvent used to form said solvent solution is selected from the group consisting of methylene chloride, dimethylacetamide, N-methylpyrrolidinone, dimethylformamide, acetone, and a phenols.

11. The module of claim 10 wherein said solvent comprises a phenol selected from the group consisting of phenol, chlorinated phenol, cresol, chlorinated cresol, and resorcinol.

12. The module of claim 1 wherein said hollow fiber is a copolyimide, said copolyimide comprising the imidization reaction product of the condensation reaction product in a solvent of at least three reactants selected from (a) a diamine A or A' and (b) a dianhydride B or B', wherein A, A', B, and B' are selected so that
the homopolymers formed from the condensation reaction of A with B following post-treatment have a glass transition temperature of ≧300° C., and
the homopolymers formed from the condensation reaction of A' with B' following post-treatment have a resistance to said solvent that is characterized by a dense film of said homopolymer absorbing ≦50 wt % of said solvent when immersed in said solvent in pure form at 20° C. for at least 24 hours, and wherein said post-treatment step is selected from heat treatment and exposure to radiation selected from the group consisting of UV, microwave, and X-ray radiation, and electron beams.

13. The module of claim 1 wherein said permselective coating is hydrophilic.

14. The module of claim 13 wherein said hydrophilic permselective coating comprises a cross-linked blend of polyvinyl alcohol and polyethyleneimine.

15. The module of claim 1 wherein said solvent-resistant hollow support fiber retains at least 50% of its burst pressure when soaked in the solvent used to form the polymer solution.

16. The module of claim 1 wherein the direction of flow of said feed stream is substantially countercurrent to a direction of flow of a stream of the permeate.

17. The module of claim 1 wherein said permselective coating has a selectivity of at least 10 for said first vapor relative to at least one other vapor in said mixture of vapors.

18. The module of claim 1 wherein said permselective coating has a selectivity of at least 50 for said first vapor relative to at least one other vapor in said mixture of vapors.

19. The module of claim 1 wherein said chamber includes means for introducing a sweep stream at the retentate end of the module.

20. The module of claim 19 wherein said means for introducing includes at least one port at the retentate end of the module.

21. The module of claim 1 wherein said permselective coating is formed by a process selected from the group consisting of solution coating, dip coating, painting, spraying, and interfacial polymerization.

22. The module of claim 1 wherein said permselective coating is cross-linked after it is applied to said support fiber.

23. The module of claim 1 wherein said permselective coating is cross-linked in a post-treatment step after it is applied to said support fiber.

24. The module of claim 23 wherein said post-treatment step comprises heat treatment.

25. The module of claim 23 wherein said permselective coating comprises a blend of a polyvinyl alcohol and a polyethyleneimine cross-linked with ethyl succinate.

26. The module of claim 25 wherein said cross-linked permselective coating has been cross-linked by heat treatment.

27. The module of claim 26 wherein said heat treatment is performed at a temperature greater than 80° C.

28. The module of claim 26 wherein said heat treatment is performed at a temperature greater than 100° C.

29. The module of claim 26 wherein said heat treatment is conducted in an inert atmosphere.

30. The module of claim 25 wherein the mass ratio of polyvinylalcohol to polyethyleneimine is between 0.25 and 4.

31. The module of claim 30 wherein said mass ratio is about 0.5.

32. A vapor permeation process comprising:

(a) contacting a vaporous feed stream containing a first vapor and at least one additional vapor with the feed side of thin film composite hollow fiber membranes arranged substantially parallel to each other in a chamber having a feed end and a retentate end, each of said composite hollow fiber membranes comprising:

(i) a highly permeable solvent-resistant hollow support fiber comprising a polymer selected from the group consisting of polyimides, polybenzimidazoles, polyphenylquinoxolanes, and polymers with pendant or terminal cross-linkable groups, said support fiber having been formed from a polymer dissolved in a solvent and then rendered solvent-resistant in a post-treatment step whereby said solvent-resistant hollow support fiber retains at least 20% of its burst pressure when soaked in said solvent used to form said polymer solution, said post-treatment step being selected from heat treatment and exposure to radiation selected from the group consisting of UV, microwave, and X-ray radiation, and electron beams, and (ii) a permselective coating on the surface of said support fiber, said permselective coating being a cross-linked polymer selected from the group consisting of poly (acrylic acids), poly (acrylates), polyacetylenes, poly (vinyl acetates), polyacrylonitriles, polyamines, polyamides, polyethers, polyurethanes, polyvinyl alcohols, polyesters, cellulose, cellulose esters, cellulose ethers, chitosan, chitin, polymers containing hydrophilic groups, elastomeric polymers, halogenated polymers fluoroelastomers, polyvinyl halides, polyphosphazenes, poly (trimethylsilylpropyne), polysiloxanes, poly (dimethyl siloxanes) and copolymers and blends thereof, and having a selectivity of at least 5 for said first vapor over at least one other vapor in said mixture of vapors;

(b) permitting said first vapor in said feed stream to permeate from the feed side to the permeate side of said hollow fiber membranes to form a permeate stream enriched in said first vapor and a retentate stream depleted in said first vapor; and (c) removing said permeated stream enriched in said first vapor from said chamber near the feed end of said chamber.

33. The process of claim 32 wherein said feed stream is directed to the inside of said composite hollow fiber membranes.

34. The process of claim 33 wherein said solvent-resistant hollow support fiber retains at least 50% of its burst pressure when soaked in the solvent used to form the polymer solution.

35. The process of claim 33 wherein the direction of flow of said feed stream is substantially countercurrent to a direction of flow of a stream of the permeate.

36. The process of claim 33 wherein said permselective coating has a selectivity of at least 10 for said first vapor relative to at least one other vapor in said mixture of vapors.

37. The process of claim 36 wherein said permselective coating has a selectivity of at least 50 for said first vapor relative to at least one other vapor in said mixture of vapors.

38. The process of claim 33 wherein said chamber includes means for introducing a sweep stream at the retentate end of the module.

39. The process of claim 38 wherein said means for introducing includes at least one port at the retentate end of the module.

40. The process of claim 33 wherein said permselective coating is formed by a process selected from the group consisting of solution coating, dip coating, painting, spraying, and interfacial polymerization.

41. The process of claim 33 wherein said permselective coating is cross-linked after it is applied to said support fiber.

42. The process of claim 33 wherein said permselective coating is cross-linked in a post-treatment step after it is applied to said support fiber.

43. The process of claim 42 wherein said post-treatment step comprises heat treatment.

44. The process of claim 32 wherein said feed stream is directed to the outside of said composite hollow fiber membranes.

45. The process of claim 32 wherein said permselective coating is on the inside of said hollow support fiber.

46. The process of claim 32 wherein said permselective coating is on the outside of said hollow support fiber.

47. The process of claim 32 wherein said hollow fiber comprises a polymer having pendant or terminal ethynyl groups selected from the group consisting of polysulfones, polyethersulfones and polyetherimides.

48. The process of claim 32 wherein said hollow support fiber has a maximum surface pore size of less than about 0.5 μm.

49. The process of claim 32 wherein said hollow support fiber has an effective nitrogen permeability of greater than 5 $Nm^3/m^2 \cdot hr \cdot atm$.

50. The process of claim 49 wherein said hollow support fiber has an effective nitrogen permeability greater than 50 $Nm^3/m^2 \cdot hr \cdot atm$.

51. The process of claim 32 wherein said solvent used to form said solvent solution is selected from the group consisting of methylene chloride, dimethylacetamide, N-methylpyrrolidinone, dimethylformamide, acetone, and phenols.

52. The process of claim 51 wherein said solvent comprises a phenol selected from the group consisting of phenol, chlorinated phenol, cresol, chlorinated cresol, and resorcinol.

53. The process of claim 32 wherein said hollow fiber is a copolyimide, said copolyimide comprising the imidization reaction product of the condensation reaction product in a solvent of a least three reactants selected from (a) a diamine A or A' and (b) a dianhydride B or B' wherein A, A', B, and B' are selected so that
the homopolymers formed from the condensation reaction of A with B following post-treatment have a glass transition temperature of $\geq 300°$ C., and
the homopolymers formed from the condensation reaction of A' with B' following post-treatment have a resistance to said solvent that is characterized by a dense film of said homopolymer absorbing $\leq 20$ wt % of said solvent when immersed in said solvent in pure form at 20° C. for at least 24 hours.

54. The process of claim 32 wherein said permselective coating is hydrophilic.

55. The process of claim 54 wherein said hydrophilic permselective coating is selected from the group consisting of polyamides, polyvinylalcohols, polyesters, cellulose, cellulose esters, cellulose ethers, polyurethanes, chitosan, chitin, polyacrylonitriles, polyamines, polyacetylenes, and copolymers and blends thereof.

56. The process of claim 54 wherein said hydrophilic permselective coating comprises a cross-linked blend of polyvinyl alcohol and polyethyleneimine.

57. A vapor permeation process comprising:

(a) contacting a vaporous feed stream containing a first vapor and at least one additional vapor with the feed side of thin film composite hollow fiber membranes arranged substantially parallel to each other in a chamber having feed and retentate ends, means for introducing a sweep stream at the retentate end of said chamber and means for removing permeate at the feed end of said chamber, each of said composite hollow fiber membranes comprising:

(i) a highly permeable solvent-resistant hollow support fiber, comprising a polymer selected from the group consisting of polyimides, polybenzimidazoles, polyphenylquinoxolanes, and polymers with pendant or terminal cross-linkable groups, said support fiber having been formed from a polymer dissolved in a solvent and then rendered solvent-resistant in a post-treatment step, whereby said solvent-resistant hollow support fiber retains at least 20% of its burst pressure when soaked in said solvent used to form said polymer solution, said post-treatment step being selected from heat treatment and exposure to radiation selected from the group consisting of UV, microwave, and X-ray radiation, and electron beams, and (ii) a permselective coating on the surface of said support fiber, said permselective coating being a cross-linked polymer selected from the group consisting of poly (acrylic acids), poly (acrylates), polyacetylenes, poly (vinyl acetates), polyacrylonitriles, polyamines, polyamides, polyethers, polyurethanes, polyvinyl alcohols, polyesters, cellulose, cellulose esters, cellulose ethers, chitosan, chitin, polymers containing hydrophilic groups, elastomeric polymers, halogenated polymers, fluoroelastomers, polyvinyl halides, polyphosphazenes, poly (trimethylsilylpropyne), polysiloxanes, poly (dimethyl siloxanes) and copolymers and blends thereof, and having a selectivity of at least 5 for said first vapor over at least one other vapor in said mixture of vapors; and (b) directing a sweep stream to the permeate side of said hollow fiber membranes by said means for introducing a sweep stream in a manner such that the flow of said sweep stream is substantially countercurrent to the flow of said feed stream, thereby transporting at least a portion of said first vapor from said feed side to said permeate side of said membrane to form a combined permeate side mixture of said sweep stream and said first vapor;

(c) removing a retentate stream from said retentate end of said chamber that is depleted in said first vapor; and (d) removing said combined permeate side mixture from said means for removing permeate.

58. The process of claim 57 wherein said sweep stream comprises a condensable vapor.

59. The process of claim 57 wherein said sweep stream comprises a portion of the retentate stream.

* * * * *

UNITED STATES PATENT AND TRADEMARK OFFICE
CERTIFICATE OF CORRECTION

PATENT NO. : 5,753,008
DATED : May 19, 1998
INVENTOR(S) : Friesen et al.

It is certified that error appears in the above-identified patent and that said Letters Patent is hereby corrected as shown below:

Title page,
ABSTRACT,
Insert percent (%) symbol after "20" near end of abstract Column 5,
Line 32, change ">250° C" to read -- $\geq$250° C --

Column 13, claim 32, (ii),
Line 19, insert comma (,) between "polymers" and "fluoroelastomers"

Signed and Sealed this

Twenty-sixth Day of February, 2002

Attest:

JAMES E. ROGAN
Attesting Officer        Director of the United States Patent and Trademark Office